US012123428B2

(12) United States Patent
Clingman

(10) Patent No.: US 12,123,428 B2
(45) Date of Patent: Oct. 22, 2024

(54) SEAM-SEALED POTHEAD TO MOTOR CONNECTION

(71) Applicant: Baker Hughes Oilfield Operations LLC, Houston, TX (US)

(72) Inventor: James Christopher Clingman, Broken Arrow, OK (US)

(73) Assignee: Baker Hughes Oilfield Operations LLC, Houston, TX (US)

(*) Notice: Subject to any disclaimer, the term of this patent is extended or adjusted under 35 U.S.C. 154(b) by 87 days.

(21) Appl. No.: 17/720,144

(22) Filed: Apr. 13, 2022

(65) Prior Publication Data

US 2023/0332617 A1    Oct. 19, 2023

(51) Int. Cl.
  *F04D 29/40*   (2006.01)
  *E21B 43/12*   (2006.01)
  *F04D 29/08*   (2006.01)
  *H02K 5/10*    (2006.01)
  *H02K 11/00*   (2016.01)

(52) U.S. Cl.
  CPC .......... *F04D 29/406* (2013.01); *E21B 43/128* (2013.01); *F04D 29/086* (2013.01); *H02K 5/10* (2013.01); *H02K 11/00* (2013.01)

(58) Field of Classification Search
  CPC .... F04D 29/406; F04D 29/086; E21B 43/128; H02K 5/10; H02K 11/00
  See application file for complete search history.

(56) References Cited

U.S. PATENT DOCUMENTS

| 3,980,369 | A | * | 9/1976 | Panek | E21B 17/028 439/204 |
| 4,737,112 | A | * | 4/1988 | Jin | H01R 4/04 439/91 |
| 5,700,161 | A | * | 12/1997 | Plummer | E21B 17/0285 439/587 |
| 7,575,458 | B2 | | 8/2009 | Parmeter et al. | |
| 7,789,689 | B2 | | 9/2010 | Frey et al. | |
| 8,512,074 | B2 | | 8/2013 | Frey | |
| 8,692,115 | B2 | | 4/2014 | Rumbaugh et al. | |
| 10,502,004 | B2 | | 12/2019 | Knapp et al. | |
| 10,938,145 | B2 | | 3/2021 | Golberg | |

(Continued)

FOREIGN PATENT DOCUMENTS

KR    20170050929 A  *  5/2017

OTHER PUBLICATIONS

International Search Report and Written Opinion for PCT/US2023/018541 mailed Jul. 11, 2023.

*Primary Examiner* — Dominick L Plakkoottam
(74) *Attorney, Agent, or Firm* — Baker Hughes Company

(57) ABSTRACT

A pumping system configured to recover wellbore fluids from a wellbore includes an electric motor that has a motor head, a pothead receiving bore within the motor head, a motor insulator block within the motor head, and a stator lead within the motor insulator block. The pumping system further includes a motor lead cable and a pothead connector connected between the motor head and the motor lead cable. The pumping system includes a hermetically fused pothead-to-motor connection at an interface between the pothead connector and the motor head that obviates the need for conventional elastomeric seals at the interface between the pothead connector and the motor head.

14 Claims, 4 Drawing Sheets

(56) References Cited

U.S. PATENT DOCUMENTS

| | | | |
|---|---|---|---|
| 2003/0156947 A1* | 8/2003 | Gross | E21B 43/128 |
| | | | 417/424.2 |
| 2004/0014359 A1* | 1/2004 | Knox | H01R 13/523 |
| | | | 439/587 |
| 2011/0234421 A1* | 9/2011 | Smith | H01B 3/004 |
| | | | 340/854.3 |
| 2012/0052721 A1* | 3/2012 | Watson | E21B 17/025 |
| | | | 439/519 |
| 2012/0063931 A1 | 3/2012 | Rumbaugh et al. | |
| 2012/0100737 A1 | 4/2012 | Frey | |
| 2015/0023822 A1 | 1/2015 | Majors et al. | |
| 2015/0325943 A1* | 11/2015 | Frey | H01R 13/512 |
| | | | 439/275 |
| 2016/0024854 A1* | 1/2016 | Clingman | H01R 13/6215 |
| | | | 439/587 |
| 2016/0181884 A1* | 6/2016 | Rumbaugh | H01R 13/523 |
| | | | 310/71 |
| 2018/0163728 A1* | 6/2018 | Zugelder | H01R 13/52 |
| 2019/0134739 A1* | 5/2019 | Cain | B23K 20/227 |
| 2020/0091652 A1* | 3/2020 | Golberg | H01R 13/523 |
| 2020/0220431 A1* | 7/2020 | Wrighton | H02K 5/132 |
| 2020/0274416 A1* | 8/2020 | Wrighton | E21B 43/128 |
| 2021/0328379 A1 | 10/2021 | Clingman | |
| 2022/0056767 A1* | 2/2022 | Part | H02G 15/04 |
| 2022/0065081 A1* | 3/2022 | Wrighton | H02K 5/132 |

\* cited by examiner

SEAM-SEALED POTHEAD TO MOTOR CONNECTION

FIELD OF THE INVENTION

The present invention relates generally to electric submersible pumping systems and more particularly to systems and methods for making sealed connections between components within or between a pothead connector and motor head of the submersible pumping system.

BACKGROUND

Submersible pumping systems are often deployed into wells to recover petroleum fluids from subterranean reservoirs. Typically, a submersible pumping system includes a number of components, including an electric motor coupled to one or more high performance pump assemblies. Production tubing is connected to the pump assemblies to deliver the petroleum fluids from the subterranean reservoir to a storage facility on the surface.

The motor is typically an oil-filled, high capacity electric motor that can vary in length from a few feet to nearly one hundred feet, and may be rated up to hundreds of horsepower. Typically, electricity is generated on the surface and supplied to the motor through a heavy-duty power cable. The power cable typically includes several separate conductors that are individually insulated within the power cable. Power cables are often constructed in round or flat configurations.

In many applications, power is conducted from the power cable to the motor via a "motor lead extension" or "motor lead cable." Motor lead extensions are often constructed in a "flat" configuration for use in the limited space between downhole equipment and the well casing. The motor lead extension typically includes one or more "leads" that are configured for connection to a mating receptacle on the motor. The leads from the motor lead extension are often retained within a motor-connector that is commonly referred to as a "pothead." The pothead relieves the stress or strain realized between the motor and the leads from the motor lead extension.

In the past, the connections between the pothead, the motor and the associated conductors have been sealed using elastomeric or rubber elements that are designed to prevent the ingress of wellbore fluids into the pothead, motor and cables. Although widely adopted, the reliance on elastomeric seals presents a potential failure mode if the elastomeric seals are compromised, which may occur when the seals are exposed to elevated temperatures and downhole fluids that are corrosive or abrasive. Accordingly, there is a need for an improved system for sealing the pothead connector to the motor. It is to these and other deficiencies in the prior art that exemplary embodiments of the present invention are directed.

SUMMARY OF THE INVENTION

In one aspect, embodiments of the present disclosure are directed to a pumping system for use in recovering wellbore fluids from a wellbore. The pumping system includes an electric motor that has a motor head, a pothead receiving bore within the motor head, a motor insulator block within the motor head, and a stator lead within the motor insulator block. The pumping system further includes a motor lead cable, a pothead connector connected between the motor head and the motor lead cable, and a hermetically fused pothead-to-motor connection at an interface between the pothead connector and the motor head.

In another aspect, embodiments of the present disclosure are directed to a pumping system for use in recovering wellbore fluids from a wellbore, where the pumping system has an electric motor. The electric motor has a motor head, a pothead receiving bore within the motor head, a motor insulator block within the motor head, and a stator lead within the motor insulator block. The pumping system further includes a motor lead cable and a pothead connector connected between the motor head and the motor lead cable. The pothead connector includes an upper housing, a lower housing, and a pothead insulator block. The pumping system further includes a first hermetically fused interface within the pothead connector or the motor head.

In yet another aspect, embodiments of the present disclosure are directed to a method for sealing a first interface between two components within a submersible pumping system that includes a pothead connector and a motor head. The method includes the steps of identifying the first interface within the submersible pumping system, and hermetically fusing the first interface. The step of hermetically fusing the first interface includes the use of a process selected from the group of hermetic fusing processes consisting of ultrasonic welding, friction welding, laser welding, and stir welding.

WRITTEN DESCRIPTION

Figure 1:
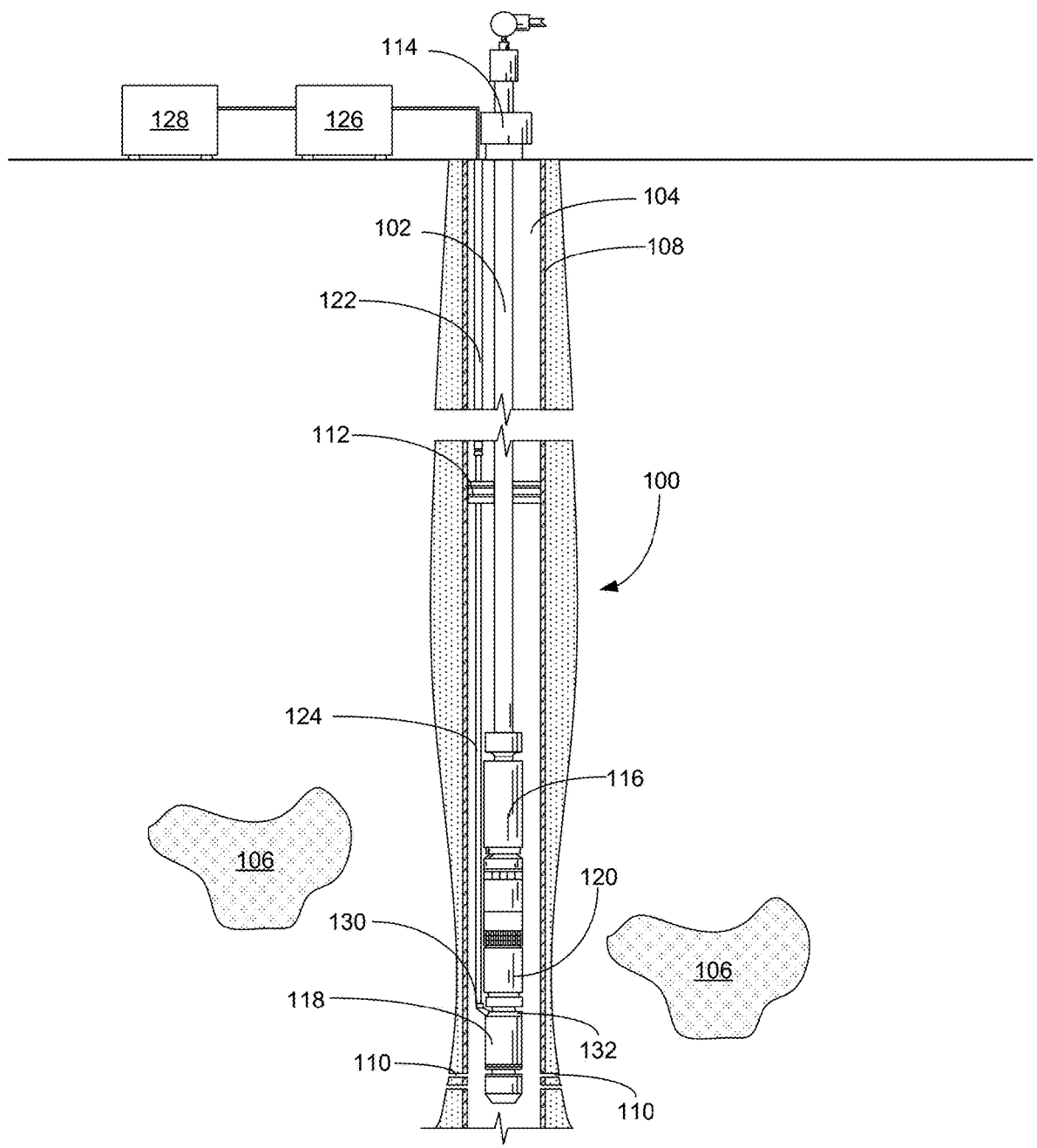
FIG. 1 depicts a submersible pumping system constructed in accordance with exemplary embodiments.

In accordance with an exemplary embodiment of the present invention, FIG. 1 shows a front view of a downhole pumping system 100 attached to production tubing 102. The downhole pumping system 100 and production tubing 102 are disposed in a wellbore 104, which is drilled for the production of a fluid such as water or petroleum from a subterranean geologic formation 106.

The wellbore 104 includes a casing 108, which has perforations 110 that permit the exchange of fluids between the wellbore 104 and the geologic formation 106. One or more packers 112 or other zonal isolation devices can be used to separate various segments or stages within the wellbore 104. Although the downhole pumping system 100 is depicted in a vertical well, it will be appreciated that the downhole pumping system 100 can also be used in horizontal, deviated, and other non-vertical wells. Accordingly, the terms "upper" and "lower" should not be construed as limiting the disclosed embodiments to use in vertical wells. The terms "upper" and "lower" are simply intended to provide references to components that are closer to a wellhead 114 on the surface ("upper") or closer to the perforations 110 and terminal end of the wellbore 104 ("lower").

The production tubing 102 connects the pumping system 100 to the wellhead 114. Although the pumping system 100 is primarily designed to pump petroleum products, it will be understood that the present invention can also be used to move other fluids. It will also be understood that, although each of the components of the pumping system 100 are primarily disclosed in a submersible application, some or all of these components can also be used in surface pumping operations.

The pumping system 100 includes a pump 116, a motor 118 and a seal section 120. The motor 118 converts the electrical energy into mechanical energy, which is transmitted to the pump 116 by one or more shafts. The pump 116 then transfers a portion of this mechanical energy to fluids from the wellbore 104, causing the wellbore fluids to move through the production tubing 102 to the wellhead 114. In some embodiments, the pump 116 is a turbomachine that uses one or more impellers and diffusers to convert mechanical energy into pressure head. In other embodiments, the pump 116 is a progressive cavity (PC) or positive displacement pump that moves wellbore fluids with one or more screws or pistons.

The seal section 120 shields the motor 118 from mechanical thrust produced by the pump 116. The seal section 120 is also configured to prevent the introduction of contaminants from the wellbore 104 into the motor 118. Although only one pump 116, seal section 120 and motor 118 are shown, it will be understood that the downhole pumping system 100 could include additional pumps 116, seal sections 120 or motors 118. It will be appreciated that in some embodiments, the seal section 120 is not used or is incorporated within another component in the pumping system 100 (e.g., the motor 118 or the pump 116).

The motor 118 receives power from a surface-based supply through a power cable 122 and one or more motor lead extensions 124. In many embodiments, the power cable 122 and motor lead extensions 124 are configured to supply the motor 118 with three-phase electricity from a surface-based variable speed (or variable frequency) drive 126, which receives electricity from a power source 128. The motor lead extension 124 connects to the motor 120 with a pothead connector 130. In some embodiments, the motor 120 includes a motor head 132 and the pothead connector 130 is connected to the motor head 132.

Figure 2:
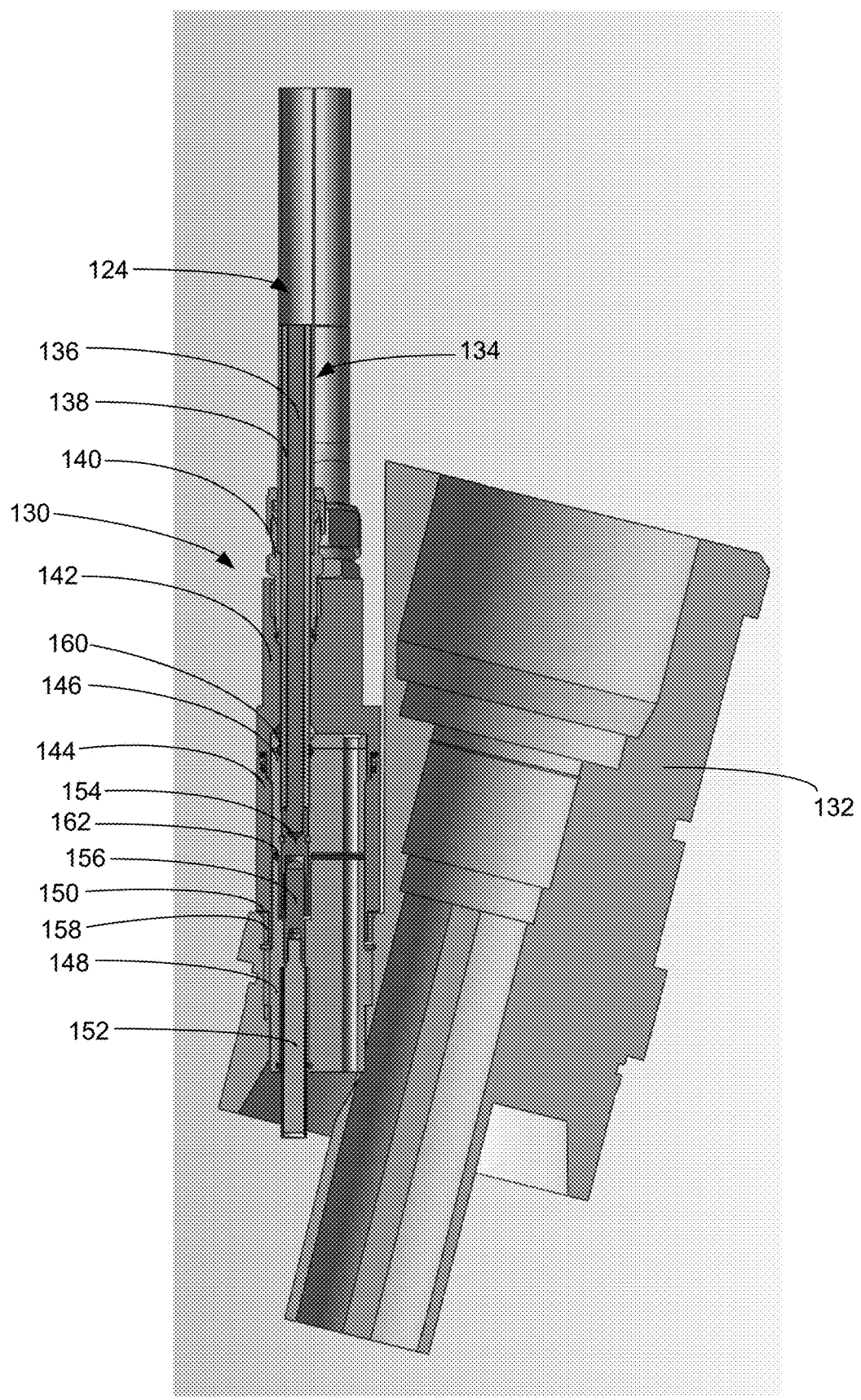
FIG. 2 is a cross-sectional view of a standard pothead-to-motor connection.

Turning to FIG. 2, shown therein is a cross-sectional depiction of the motor head 132, a standard pothead connector 130, and a portion of the motor lead extension 124. The pothead connector 130 is generally configured to provide a sealed connection between the motor lead extension 124 and the motor head 132. The motor lead extension 124 includes a plurality of insulated leads 134 that each include an electrical conductor 136 and an insulation layer 138. The insulated leads 134 enter the upper end of the pothead connector 130 through a compression fitting 140, that threads into an upper housing 142 of the pothead connector 130. The insulated lead 134 extends through the upper housing 142 into a lower housing 144 of the pothead connector 130.

The pothead connector 130 includes a pothead insulator block 146 that extends between the upper and lower housings 142, 144. The insulated lead 134 passes into the pothead insulator block 146. The motor head 132 includes a motor insulator block 148 that is partially contained within the motor head 132. In the standard pothead connector 130 depicted in FIG. 2, the lower end of the lower housing 144 of the pothead connector 130 extends around the outside of the motor head insulator block 148 within a pothead receiving bore 150 of the motor head 132.

A stator lead 152 extends from the motor windings (not shown) within the motor 118 into the motor head insulator block 148. A conductive terminal 154 extends between the motor head insulator block 148 and the pothead insulator block 146 and provides an electrical connection between the conductor 136 of the insulated lead 134 and the stator lead 152. In some embodiments, the terminal 154 is configured as a female-to-female coupling. In some embodiments, a terminal pin 156 is used to connect the stator lead 152 to the terminal 154.

In the past, elastomeric seals have been used to seal the various interfaces between the pothead connector 130 and the motor head 132, and to seal the internal components within the pothead connector 130 and motor head 132. An elastomeric boot seal 158 has been used to seal the connection between the pothead connector 130 and the motor head 132. Elastomeric ring seals 160 have been used to seal the connections between the insulated leads 134 and the pothead insulator block 146. An elastomeric face seal 162 has been used to seal the interface between the pothead insulator block 146 and the motor head insulator block 148. Other elastomeric seals have been used to seal the compression fitting 140 to the upper housing 142 of the pothead connector 130, between the upper and lower housings 142, 144 of the pothead connector 130, and between the stator lead 152 and the motor head insulator block 148. Although widely adopted, these various elastomeric seals can fail over time, which can lead to the unwanted ingress of fluids into the pothead connector 130, motor lead extension 124 and motor 118.

Figure 3:
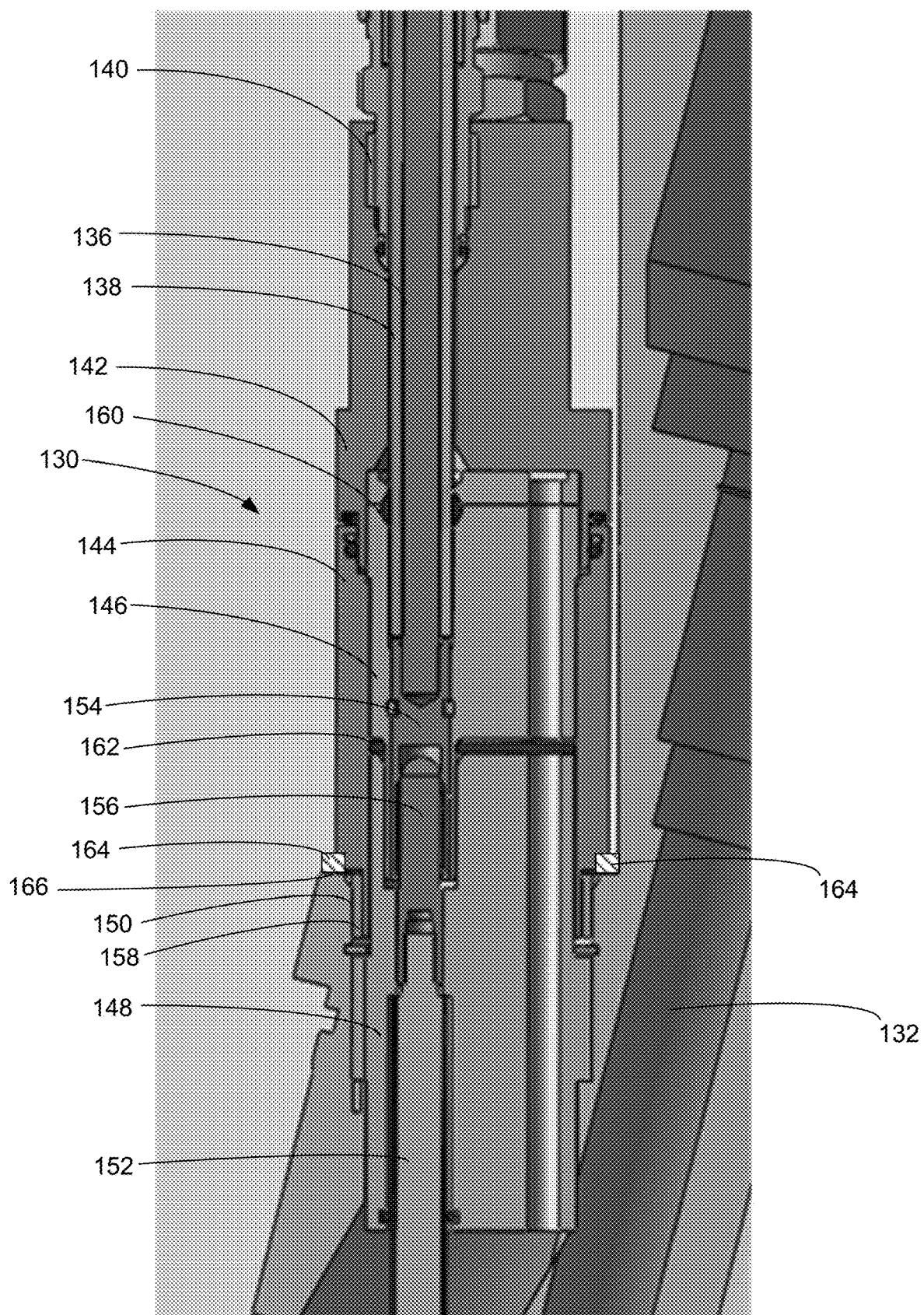
FIG. 3 presents a cross-sectional view of a first embodiment of the pothead and motor connection of the pumping system of FIG. 1.

Turning to FIG. 3, shown therein is an embodiment of the pumping system 100 in which the pothead connector 130 has been connected to the pothead receiving bore 150 with a bonded connection. As depicted in FIG. 3, the pothead connector 130 has been bonded to an upper face 166 of the motor head 132 to form a hermetically fused pothead-to-motor connection 164. In one embodiment, the hermetically sealed pothead-to-motor connection 164 is prepared by using an ultrasonic welding process to provide a circumferential weld at the exterior interface between the lower housing 144 of the pothead connector and the upper face 166 of the pothead receiver bore 150. The pothead-to-motor connection 164 can be used as an alternative to the boot seal 158, or in addition to the boot seal 158 (as depicted in FIG. 3). In other embodiments, the pothead-to-motor connection 164 is established using friction welding, laser welding, or a combination of friction welding, laser welding and ultrasonic welding processes.

In yet other embodiments, the pothead-to-motor connection 164 is prepared using a cure-in-place process in which an uncured elastomeric compound, such as a synthetic rubber like ethylene propylene diene monomer (EPDM), is placed around the lower housing 144 of the pothead connector 130 and the pothead receiving bore 150 before the pothead connector 130 is approximated with the motor head 132. Once the pothead connector 130 has been plugged into the motor head 132, heat can be applied to the pothead-to-motor connection 164 to cure the synthetic rubber compound in situ to seal the pothead connector 130 to the motor head 132. Convective, radiant or inductive heating processes can be used to selectively cure the synthetic rubber. The pothead-to-motor connection 164 can extend from the upper face 166 into the interface between the lower housing 144 and the pothead receiving bore 150. In this embodiment, external components of the pothead connector 130 and the motor head 132 are hermetically sealed together without creating a hermetic seal at the internal interfaces between the pothead connector 130 and the motor head 132. This permits motor lubricants or other internal fluids and pressure to pass between the motor 118 and the pothead connector 130.

As used herein, the term "hermetically fuse" refers collectively to the joining of adjacent components through ultrasonic welding, friction welding, laser welding, stir welding, and cure-in-place compounds that chemically join adjacent components. In each case, the process of hermetically fusing the pothead connector 130 to the motor head 132 creates a liquid-tight sealed connection that prohibits the ingress of fluids at the interface between the pothead connector 130 and motor head 132, while also strengthening the mechanical connection between those components.

Figure 4:
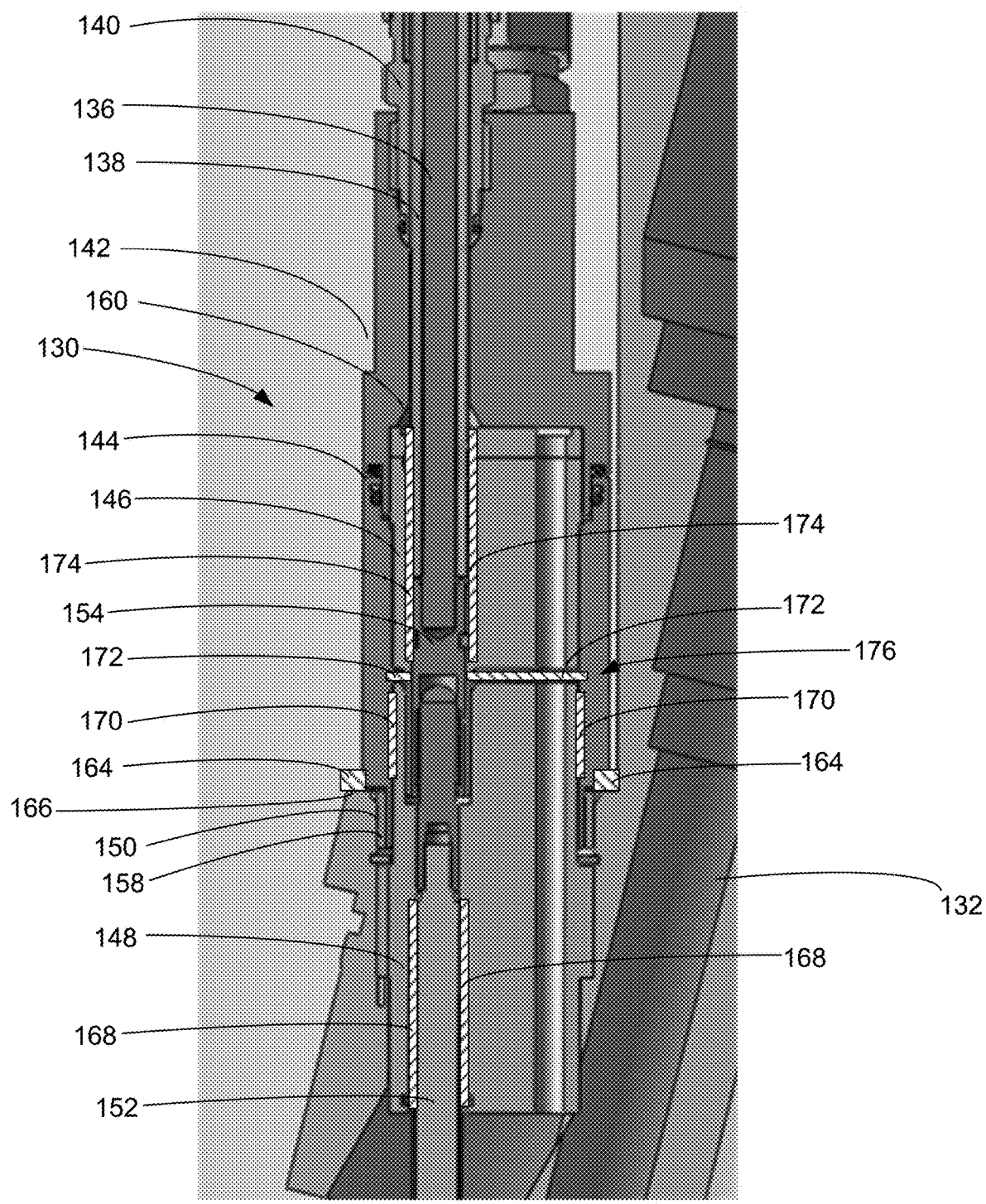
FIG. 4 presents a cross-sectional view of a second embodiment of the pothead and motor connection of the pumping system of FIG. 1.

Turning to FIG. 4, shown therein is yet another embodiment in which a number of internal elastomeric seals have been replaced by hermetically fusing interfaces between adjacent components within and between the pothead connector 130 and the motor head 132. In addition to the pothead-to-motor connection 164, the stator lead 152 can be hermetically fused within the motor head insulator block 148 at a stator lead connection 168. The motor head insulator block 146 can be hermetically fused to the inside of the lower housing 144 at an I-block-to-lower housing connection 170. The pothead insulator block 146 can be hermetically fused to the motor head insulator block 148 at an insulator block connection 172. The insulated leads 134 can be hermetically fused to the pothead insulator block 146 at an insulated lead connection 174. Hermetically fusing each of these interfaces creates a sealed pressure barrier 176 between the motor head 132 and the pothead connector 130 that prevents fluids from passing between the pothead connector 130 and the motor head 132.

Thus, exemplary embodiments provide a pothead connector 130 and motor head 132 that include one or more interfaces between adjacent components that have been hermetically fused together. The use of hermetically fused interfaces within the pothead connector 130 and the motor head 132 reduces or obviates the need for conventional elastomeric or rubber seals, which are difficult to install and subject to failure over time.

It is to be understood that even though numerous characteristics and advantages of various embodiments of the present invention have been set forth in the foregoing description, together with details of the structure and functions of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. It will be appreciated by those skilled in the art that the teachings of the present invention can be applied to other systems without departing from the scope and spirit of the present invention. For example, it may be useful to hermetically fuse the power cable 124 or motor lead extension 124 to the packer 112 to create a durable, sealed connection through the packer 124 without the use of elastomeric seals.

What is claimed is:

1. A pumping system for use in recovering wellbore fluids from a wellbore, the pumping system comprising:
   an electric motor, wherein the electric motor comprises:
      a motor head;
      a pothead receiving bore within the motor head, wherein the pothead receiving bore includes an upper face;
      a motor insulator block within the motor head; and
      a stator lead within the motor insulator block;
   a motor lead cable, wherein the motor lead cable comprises an insulated lead;
   a pothead connector connected between the motor head and the motor lead cable,
      wherein the pothead connector includes a lower housing; and
   a hermetically fused pothead-to-motor connection at an interface between the lower housing of the pothead connector and the motor head upper face of the pothead receiving bore.

2. The pumping system of claim 1, wherein the pothead-to-motor connection comprises an external circumferential weld between the lower housing of the pothead connector and the upper face of the pothead receiver bore of the motor head.

3. The pumping system of claim 1, wherein the pothead-to-motor connection comprises a cure-in-place EPDM rubber.

4. The pumping system of claim 1, further comprising an internal boot seal between the pothead connector and the motor head.

5. The pumping system of claim 1, wherein the pothead connector further comprises:
   an upper housing; and
   a pothead insulator block contained within the upper and lower housing.

6. The pumping system of claim 5, further comprising a hermetically fused insulator block connection at an interface between the pothead insulator block and the motor insulator block.

7. The pumping system of claim 5, further comprising a hermetically fused I-block to lower housing connection at an interface between the motor head insulator block and the lower housing of the pothead connector.

8. The pumping system of claim 5, further comprising a hermetically fused insulated lead connection at an interface between the pothead insulator block and the insulated lead.

9. The pumping system of claim 5, further comprising a hermetically sealed stator lead connection at an interface between the stator lead and the motor insulator block.

10. A pumping system for use in recovering wellbore fluids from a wellbore, the pumping system comprising:
    an electric motor, wherein the electric motor comprises:
       a motor head;
       a pothead receiving bore within the motor head;
       a motor insulator block within the motor head; and
       a stator lead within the motor insulator block;
    a motor lead cable, wherein the motor lead cable comprises an insulated lead;
    a pothead connector connected between the motor head and the motor lead cable,
       wherein the pothead connector comprises:
       an upper housing;
       a lower housing; and
       a pothead insulator block; and
    a first hermetically fused interface within the pothead connector wherein the first hermetically fused interface comprises a welded insulator block connection between the pothead insulator block and the motor insulator block.

11. The pumping system of claim 10, wherein the pumping system further comprises a second hermetically fused interface, and wherein the second hermetically fused interface is a welded I-block-to-lower housing connection between the motor head insulator block and the lower housing of the pothead connector.

12. The pumping system of claim 10, wherein the pumping system further comprises a second hermetically fused interface, and wherein the second hermetically fused interface is a welded connection between the pothead insulator block and the insulated lead.

13. The pumping system of claim 10, further comprising a second hermetically fused interface.

14. The pumping system of claim 13, wherein the first hermetically fused interface is the welded insulator block connection and the second hermetically fused interface is a cure-in-place EPDM rubber connection.

* * * * *